(12) United States Patent
Raudsepp

(10) Patent No.: US 10,857,615 B2
(45) Date of Patent: Dec. 8, 2020

(54) SELF-ADJUSTING TWIN CONTACT JAWS

(71) Applicant: ESAB AB, Gothenburg (SE)

(72) Inventor: Hannes Hugo Raudsepp, Täby (SE)

(73) Assignee: ESAB AB, Gothenburg (SE)

( * ) Notice: Subject to any disclaimer, the term of this patent is extended or adjusted under 35 U.S.C. 154(b) by 526 days.

(21) Appl. No.: 15/630,720

(22) Filed: Jun. 22, 2017

(65) Prior Publication Data

US 2018/0369946 A1     Dec. 27, 2018

(51) Int. Cl.
*B23K 9/18* (2006.01)
*B23K 9/24* (2006.01)
*B23K 9/12* (2006.01)

(52) U.S. Cl.
CPC .............. *B23K 9/186* (2013.01); *B23K 9/123* (2013.01); *B23K 9/188* (2013.01); *B23K 9/24* (2013.01)

(58) Field of Classification Search
CPC .......... B23K 9/186; B23K 9/188; B23K 9/24; B23K 9/26; B23K 9/28
USPC ........................................................ 219/136
See application file for complete search history.

(56) References Cited

U.S. PATENT DOCUMENTS

| 1,732,441 | A | * | 10/1929 | Griffiths | B23K 9/282 |
| | | | | | 219/138 |
| 2,251,779 | A | * | 8/1941 | Bourque | B23K 9/282 |
| | | | | | 219/141 |
| 2,265,135 | A | * | 12/1941 | Hackmeyer | B23K 9/282 |
| | | | | | 219/138 |
| 2,379,777 | A | * | 7/1945 | Zeilstra | B23K 9/282 |
| | | | | | 219/138 |
| 6,710,300 | B2 | | 3/2004 | Steenis et al. | |
| 8,247,737 | B2 | | 8/2012 | Raudsepp et al. | |
| 2010/0140242 | A1 | | 6/2010 | Raudsepp et al. | |
| 2015/0202709 | A1 | | 7/2015 | Raudsepp et al. | |
| 2015/0336198 | A1 | | 11/2015 | Raudsepp | |
| 2016/0235473 | A1 | * | 8/2016 | Hagland | A61B 18/1445 |
| | | | | | 606/52 |

FOREIGN PATENT DOCUMENTS

| CS | 246635 | * 10/1986 | ............. B23K 25/00 |
| WO | 2010000002 A1 | 1/2010 | |

OTHER PUBLICATIONS

Translation of CS 246635.*
Notification of Transmittal of the International Search Report and Written Opinion including the International Search Report and Written Opinion for PCT/IB2018/054473, dated Oct. 17, 2018, 12 pages.

* cited by examiner

*Primary Examiner* — Erin E McGrath
(74) *Attorney, Agent, or Firm* — Edell, Shapiro & Finnan, LLC

(57) ABSTRACT

A contact device for a welding apparatus is disclosed. The contact device for feeding current to at least a first welding wire and a second welding wire. The contact device including first and second contact jaws. The first and second contact jaws including a slot formed therein to provide the first and second contact jaws with improved flexibility to individually and independently flex about the first and second welding wires to ensure proper contact is maintained between the contact jaws and the welding wire.

19 Claims, 3 Drawing Sheets

SELF-ADJUSTING TWIN CONTACT JAWS

FIELD OF THE DISCLOSURE

The present invention relates to welding and more specifically to a contact device for a submerged arc welding system and process, the contact device supplying two welding wires through the contact device to the welding puddle.

BACKGROUND

Submerged arc welding (SAW) is a welding method characterized by high productivity and quality, often used for longer welding seams in thicker materials. It is well known in a SAW process to use a consumable electrode (e.g., a welding wire) to conduct a weld current through a work piece. The weld current forms an arc between the welding wire and the work piece to create a weld puddle on the work piece. This welding wire is generally referred to as a hot wire.

SAW is often characterized in that the melted material and the arcs are protected beneath a layer of pulverized flux. The flux melts in part during the welding process, thus creating a protective layer of slag on the weld puddle. Fluxes used in SAW may be granular fusible minerals typically containing oxides of manganese, silicon, titanium, aluminum, calcium, zirconium, magnesium and other compounds, such as calcium fluoride. The flux may be specially formulated to be compatible with a given welding wire type so that the combination of flux and wire yields desired mechanical properties. During use, the flux reacts with the weld puddle to produce a weld metal chemical composition and resulting mechanical properties. It is common practice to refer to fluxes as 'active' if they add manganese and silicon to the weld. The amount of manganese and silicon added may be influenced by the arc voltage and the welding current level.

It is desirable to increase the productivity of a SAW process. One way to accomplish this is to increase the weld speed and the deposition rate (e.g., the rate at which weld metal is actually deposited onto the work piece surface). One way to increase the deposition rate is to use multiple hot wires in a single weld puddle. For example, two hot wires may be used, however, usage of more hot wires is known. Using more than one hot wire in a single weld puddle enables increased deposition rates and therefore improves the economy of the welding process.

The hot wires can be arranged in various settings or formations. For instance, the hot wires can be positioned in transverse relation (i.e., perpendicular to a welding direction), or they may be positioned in longitudinal relation (i.e., parallel to or collinear with the welding direction), or a combination thereof. Where the two hot wires are positioned in transverse relation, they may be positioned side by side. This arrangement may be used for surface welding or specific joints where a wide joint is desired. Side by side welding generally leads to lower penetration and greater width. Where the two hot wires are positioned at a longitudinal distance from each other with respect to the welding direction, the first hot wire in the direction of welding is normally referred to as a leading hot wire and the second hot wire, located behind the leading hot wire, is normally referred to as a trailing hot wire. Normally, the leading hot wire and the trailing hot wires serve different roles in the welding process. It is for instance known to control the leading hot wire such that a desired degree of penetration is obtained whereas the trailing hot wire controls weld bead appearance, contour and fill.

In connection with twin hot wires, it has proven advantageous to use two hot wires which are fed forward to the welding puddle thru a common contact device. In one embodiment, a single power source may be coupled to the contact device for distributing power to the two hot wires. With this method, more material is provided to the welding joint and increases the co-efficient of fullness or volume expansion in the joint. The coefficient of fullness is usually measured with the so-called deposition rate.

To properly perform a welding procedure however, it is important that the conduction of welding power from the contact device to the weld wires be controlled and consistent. It has long been recognized that a problem exists in consistently conducting the welding current from the contact device to the welding wires. Historically, the challenge is to get even contact pressure on both wires during welding and throughout the life cycle of the contact device even as it wears. In use, pressure is applied perpendicular to the wires which means that one of the wires will always have better contact than the other.

Under normal operating conditions, the welding wire will remain in constant contact with the contact device. Nevertheless, in some instances there may be momentary conditions in which no contact occurs. In these situations, the welding current may arc across the gap between the contact device and the welding wire. The arcing is detrimental to the welding process. In addition, non-uniformities in the cast of the welding wire, combined with potential movements in space of the welding assembly during operation, inevitably results in momentary disruptions of contact between the contact device and the welding wire.

Moreover, as the welding wires are fed through the opening in the contact device, the contact point between the welding wire and the contact device may vary. Alternatively, the welding wires may contact the contact device at more than one location simultaneously. At any particular moment, the contact location(s) between the welding wire and the contact device may be randomly variable along the length of the contact device. Because of the greater electrical resistance of the welding wires than the contact device, the amount of welding power conduction is generally highest at the contact location closest to the downstream end of the contact device (e.g., at the tip of the contact device). Thus, almost all the preheating of the welding wire occurs between the downstream contact location and the workpiece. Since the contact location furthest downstream invariably changes location within the contact device during a welding operation, the amount of preheating of the welding wire is also varied. Changes in the amount of welding wire preheating may affect the characteristics of the welding arc and therefore may contribute to poor welding performance. Thus, the contact point between the welding wire and the contact device should occur at the tip of the contact device.

Moreover, even when the welding apparatus is properly setup, over time, the contact device may wear, for example, the feed roller may wear over time, the pressure and feed rollers may deform the welding wire, etc. Thus, one of the welding wires may lose contact more than the other. Such wear may contribute to random and inconsistent interfaces between the contact device and the welding wires. The welding wire may have shavings and other debris clinging to it. When the foreign matter enters the contact device, it may become trapped and prevent the welding wire from feeding properly.

All of this may cause an instability in the welding process and increase the risk of defects. Accordingly, numerous attempts have been made to solve one or more aspects of the contact device and the welding wire interface problem. Yet, despite the long felt need for a controlled and reliable interface between a contact device and a welding wire, none of the prior solutions is entirely satisfactory.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Disclosed herein is an improved contact device for feeding current to at least a first welding wire and a second welding wire. The contact device including first and second contact jaws. The first and second contact jaws may each include a longitudinally extending slot formed therein, the slots in the two jaws being transversely aligned to form a common slot through the jaw thicknesses. The slots in the first and second contact jaws thusly define first, second, third and fourth fingers. Opposing fingers in the jaws are configured to mate about the first and second welding wires, respectively, to provide the contact jaws with improved flexibility to individually and independently flex with the first and second welding wires contained therebetween.

The contact device may include first and second contact jaws. The first and second contact jaws each may include an exterior surface and an interior surface. The interior surface of the first and second contact jaws may include first and second grooves. The slot formed in each of the first and second contact jaws may be located between the first and second grooves. The first and second grooves may be in a parallel relationship with respect to one another.

The contact device may further include a contact tube and a removable contact bracket. The contact bracket may be removably coupled to the first end of the contact tube. The first and second contact jaws may be coupled to the first end of the contact tube and the contact bracket, respectively. The first and second contact jaws may be biased towards one another to ensure proper contact between the tips of the first and second contact jaws and the welding wires.

BRIEF DESCRIPTION OF THE DRAWINGS

By way of example, a specific embodiment of the disclosed device will now be described, with reference to the accompanying drawings, in which.

DETAILED DESCRIPTION

Figure 1:
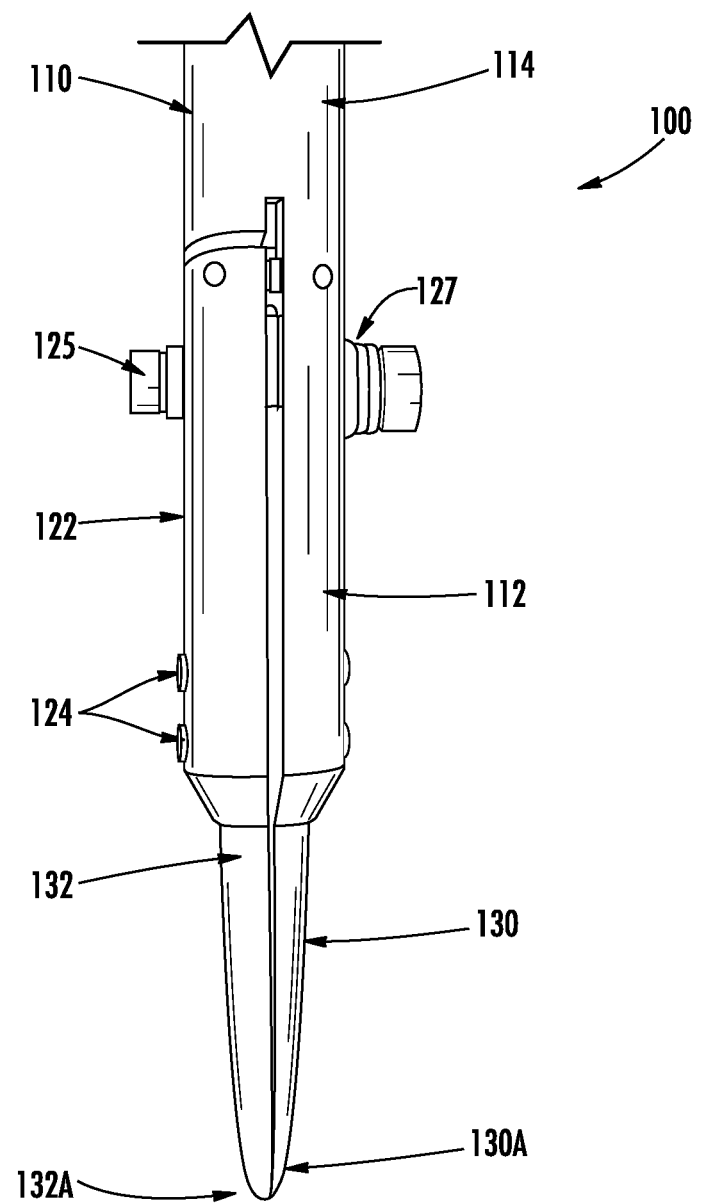
FIG. 1 is a front view illustrating an exemplary contact device for use with a welding apparatus in accordance with an illustrative, non-limiting embodiment of the present disclosure.

Embodiments of contact device in accordance with the present disclosure will now be described more fully hereinafter with reference to the accompanying drawings, in which preferred embodiments of the present disclosure are presented. The following disclosure is intended to provide illustrative embodiments of the disclosed apparatus and these exemplary embodiments should not be interpreted as limiting. The contact device of the present disclosure may, however, be embodied in many different forms and should not be construed as being limited to the embodiments set forth herein. Rather, these embodiments are provided so that this disclosure will convey certain exemplary aspects of the contact device to those skilled in the art. In the drawings, like numbers refer to like elements throughout unless otherwise noted. One of ordinary skill in the art will understand that the steps and methods disclosed may easily be reordered and manipulated into many configurations, provided they are not mutually exclusive.

As will be described in greater detail below, the contact device of the present disclosure may include first and second flexible contact jaws so that each jaw includes enhanced flexibility to enable the contact jaw to flex individually and thus provide improved contact throughout the lifecycle of the contact device.

Referring to FIG. 1, a front view of a contact device 100 for use with a welding apparatus in accordance with an illustrative, non-limiting embodiment of the present disclosure is shown. For the sake of convenience and clarity, terms such as "front," "rear," "top," "bottom," "up," "down," "vertical," and "horizontal" may be used herein to describe the relative placement and orientation of various components and portions of the contact device 100, each with respect to the geometry and orientation as they appear in FIG. 1. Said terminology will include the words specifically mentioned, derivatives thereof, and words of similar import.

The contact device 100 includes a contact tube 110 leading to first and second contact jaws 130, 132. In use, the contact device 100 may be configured so that at least two welding wires (not shown) may be received therein and fed therethrough to the welding puddle. The two welding wires may be connected to a single power source (not shown). The two welding wires may be fed forward through the first and second contact jaws 130, 132 in a parallel relationship with respect to one another, although this is not critical and the wires may be fed at an oblique angle with respect to each other.

As shown, the contact tube 110 may include a first end 112 and a second end 114. At the second end 114 of the contact tube 110 the contact tube may have a generally cylindrical or tubular shape, although other shapes are envisioned. At the first end 112 thereof, the contact tube 110 may have a semi-circular or semi-tubular shape, although other shapes are envisioned. The first end 112 of the contact tube 110 may be arranged and configured to receive a contact bracket 122. As shown, the contact bracket 122 may have a semi-cylindrical or semi-tubular shape to mate with the first end 112 of the contact tube 110 to form a cylindrical configuration. The first contact jaw 130 may be coupled to the contact tube 110 at the first end 112 thereof. The second contact jaw 132 may be coupled to the contact bracket 122, which is removably coupled to the first end 112 of the contact tube 110.

In use, the contact bracket 122 may be removably coupled to the contact tube 110 by any means now known or hereafter developed. For example, as shown, the first end 112 of the contact tube 110 and the contact bracket 122 may include one or more holes for receiving a fastener 125 such as, for example, a threaded nut and bolt. In addition, the first end 112 of the contact tube 110 and the contact bracket 122 may include a biasing feature to bias the tips 130A, 132A of the first and second contact jaws 130, 132 together. That is, the contact bracket 122 may be coupled to the contact tube 110 so that the first and second contact jaws 130, 132 may be angled with respect to each other thus ensuring that the first and second contact jaws 130, 132 contact the welding wires at the tips 130A, 132A of the first and second contact jaws 130, 132, respectively.

As illustrated, in one non-limiting exemplary embodiment, the threaded bolt 125 may include a disc spring 127 located thereabout for biasing the contact tube 110 and the contact bracket 122 together. In this manner, the disc spring 127 is compressed between the fastener 125 and the contact tube 110 and the contact bracket 122 to bias the tips 130A, 132A of the first and second contact jaws 130, 132 together, and hence against the one or more welding wires disposed therebetween. Alternatively, it is envisioned that the biasing force may be applied in ways other than the disclosed spring 127 and bolt 125 arrangement.

Figure 2:
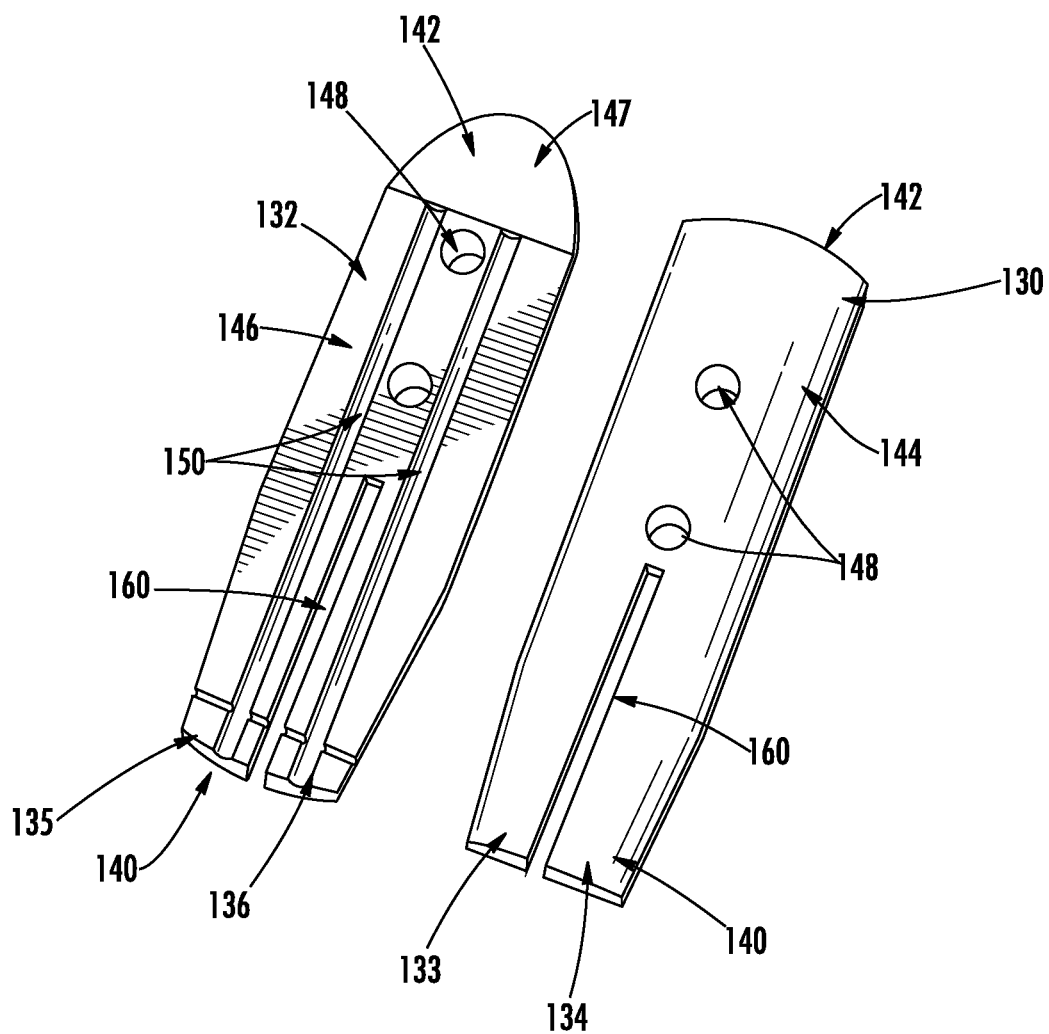
FIG. 2 is a perspective view illustrating a pair of contact jaws in accordance with the illustrative embodiment of the contact device shown in FIG. 1.

Referring to FIG. 2, each of the first and second contact jaws 130, 132 includes a first end 140, a second end 142, an exterior surface 144, and an interior surface 146. The second end 142 of each of the contact jaws 130, 132 may include one or more openings 148 formed therein for engaging the contact tube 110 and the contact bracket 122, respectively, such as via one or more fasteners 124 (FIG. 1) extending thru the openings 148, as will be described in greater detail below. In addition, the interior surface 146 of the first and second contact jaws 130, 132 may include longitudinally extending grooves 150 for receiving and guiding the welding wire therethrough. As shown, the interior surface 146 of the first and second contact jaws 130, 132 may include a tapered surface 147 adjacent the second end 142 thereof. By providing an internal tapered surface 147 at the second end 142 of the first and second contact jaws 130, 132, the device is better able to minimize or eliminate wire shavings from the surface of the welding wire entering the grooves 150.

Figure 3:
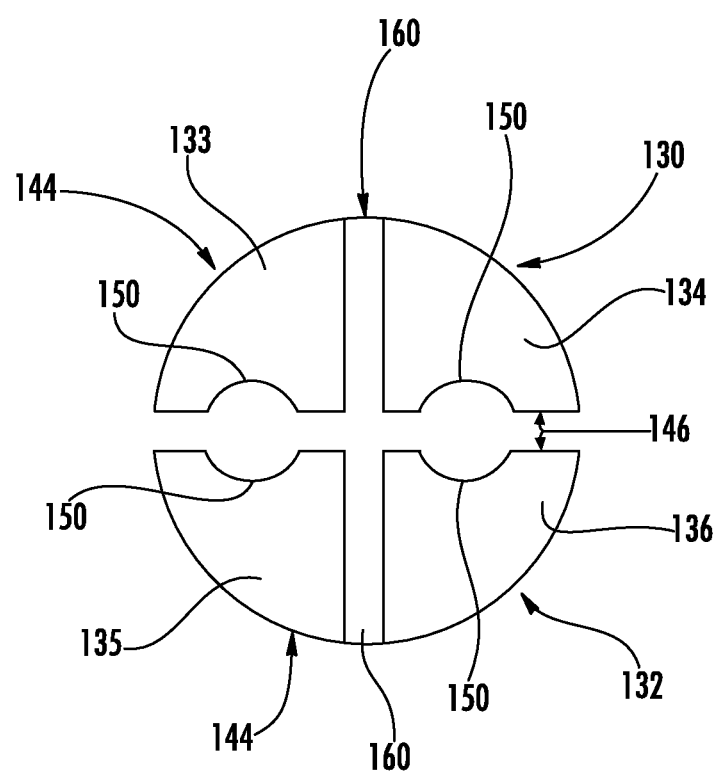
FIG. 3 is an end view of the contact jaws shown in FIG. 1.

Each of the grooves 150 may be in the form of a semi-cyindrical groove. As mentioned, contact between the welding wires and the contact jaws 130, 132 may occur at the tips 130A, 132A of the first and second contact jaws 130, 132 so that the stability of the system is maintained. In addition, contacting the welding wire at the tips 130A, 132A of the first and second contact jaws 130, 132 helps to ensure that a constant amount of stick out is maintained. Referring to FIGS. 2 and 3, in one exemplary embodiment, the first and second contact jaws 130, 132 each include a slot 160 formed therein. As shown, the slot 160 may extend from the first end 140 of the first and second contact jaws 130, 132 towards the second end 142 thereof. In the illustrated embodiment, the slot 160 extends approximately half way from the first end 140 to the second end 142 of each of the first and second contact jaws 130, 132. In this manner, the first contact jaw 130 includes first and second fingers 133, 134 and the second contact jaw 132 includes third and fourth fingers 135, 136. The first, second, third and fourth fingers 133, 134, 135, 136 being configured to individually and independently flex to engage the first and second welding wires.

In use, opposing fingers mate with one another about the welding wires. For example, the first and third fingers 133, 135 mate about the first welding wire, while the second and fourth fingers 134, 136 mate about the second welding wire. As will be appreciated, allowing the first and second contact jaws 130, 132, and specifically the first, second, third and fourth fingers 133, 134, 135, 136, to independently flex improves the contact between the first and second contact jaws 130, 132 and the welding wires throughout the usable lifecycle of the first and second contact jaws 130, 132 thereby ensuring a more stable welding process. As shown, the slot 160 may be located in-between the first and second grooves 150 formed in the interior surface 146 of the first and second contact jaws 130, 132. Alternatively, it is envisioned that the slot may not extend entirely through from the interior surface 146 to the exterior surface 144, but rather may be in the form of a thinned-out enclosed area.

In one embodiment, the slot 160 may have a width of approximately 2 mm to 4 mm. The slot 160 may have a length extending from the tips 130A, 132A of the first and second jaws 130, 132 of approximately 25 mm to 80 mm. In use, the length to width ratio is designed so that the first and second contact jaws 130, 132 can maintain proper flex throughout their lifecycle. In one embodiment, the friction force between the contact jaws and the welding wires may be approximately 50 N. In use, once the contact tips 130A, 132A of the first and second contact jaws 130, 132, respectively, contact one another, the user will know that the contact jaws 130, 132 have reached the end of their lifecycle and should be replaced.

In use, the first and second contact jaws 130, 132 may be used in combination with the biasing force as previously described. Alternatively, the biasing force may be omitted and the first and second contact jaws 130, 132 may be fixedly mounted to the contact tube 110. In this embodiment, the first and second contact jaws 130, 132 may rely exclusively on the additional flex incorporated therein.

In addition, as the first and second contact jaws 130, 132 are flexible, they will be easier to mount as they are self-adjusting as they flex. That is, for example, during manufacturing, component variances may be present. In addition, variances may also occur during mounting. However, by coupling the first and second jaws 130, 132 to the contact tube 110 and the contact bracket 122, respectively, via one or more screws 124, variances in mounting may be eliminated.

The first and second contact jaws 130, 132 may be manufactured from any appropriate conductive material now known or hereafter developed, including, for example, a high strength, temperature resistant copper alloy. In one embodiment, the first and second contact jaws 130, 132 may operate at a temperature below 300° Celsius (e.g., below the softening temperature of the high strength, temperature resistant cooper alloy). By manufacturing the contact jaws from a high strength copper, concerns that the jaws may melt or easily deform if they are made too thin, subside. In one embodiment, the first and second contact jaws may be made from a material having a yield strength of approximately 300-400 MPa.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure makes reference to certain embodiments, numerous modifications, alterations and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof.

The invention claimed is:

1. A contact device for feeding current to at least a first welding wire and a second welding wire, the contact device comprising:

a first contact jaw including a first end, a second end, and
a first slot that extends from the first end towards the second end and terminates before the second end, the first slot defining flexible first and second fingers that can individually and independently flex with respect to the first and second welding wires, wherein the first and second welding wires are fed through the contact device in a direction that is parallel to a length of the first finger, a length of the second finger, or both, a second contact jaw comprising a second slot defining third and fourth fingers, the first and third fingers being configured to contact the first welding wire, the second and fourth fingers being configured to contact the second welding wire.

2. The contact device of claim 1, wherein the first contact jaw and the second contact jaw each include an exterior surface and an interior surface, the interior surface of the first contact jaw including a first groove for guiding the first welding wire and a second groove for guiding the first and second welding wire.

3. The contact device of claim 2, wherein the first and second grooves are parallel to one another.

4. The contact device of claim 2, wherein the interior surface of the second contact jaw includes a third groove for cooperating with the first groove to guide the first welding wire and a fourth groove for cooperating with the second groove to guide the second welding wire.

5. The contact device of claim 4, wherein the first slot and the second slot are located between the first groove and the second groove and between the third groove and the fourth groove.

6. The contact device of claim 2, wherein the first groove extends along the length of the first finger and the second groove extends along the length of the second finger.

7. The contact device of claim 1, further comprising a contact tube having a first end, and a contact bracket removably coupled to the first end of the contact tube to secure the first and second contact jaws between the contact tube and the contact bracket.

8. The contact device of claim 7, wherein the first contact jaw is coupled to the contact tube and the second contact jaw is coupled to the contact bracket.

9. The contact device of claim 8, wherein the first and second contact jaws are coupled to the contact tube and the contact bracket, respectively, via one or more fasteners.

10. The contact device of claim 8, wherein coupling the first contact jaw to the contact tube and the second contact jaw to the contact bracket generates a biasing of a tip of the second contact jaw towards a tip of the first contact jaw.

11. The contact device of claim 10, wherein the contact bracket is coupled to the contact tube via a fastener and a spring member is located about the fastener to generate the biasing of the tip of the second contact jaw.

12. The contact device of claim 11, wherein the spring member is a disc spring.

13. The contact device of claim 1, wherein the first slot and the second slot are transversely aligned so that the first slot and the second slot define a common slot through thicknesses of the first and second contact jaws.

14. The contact device of claim 13, wherein the first contact jaw and the second contact jaw each include an exterior surface and an interior surface, the interior surfaces of the first and second contact jaws collectively defining a first groove for containing and guiding the first welding wire and a second groove for containing and guiding the second welding wire.

15. The contact device of claim 14, wherein the common slot is located between the first groove and the second groove.

16. The contact device of claim 14, wherein the first and second grooves are parallel to one another.

17. The contact device of claim 14, further comprising:
a contact tube having a first end, and a contact bracket removably coupled to the first end of the contact tube;
wherein the first contact jaw is coupled to the contact tube and the second contact jaw is coupled to the contact bracket; and
wherein the first and second contact jaws are coupled to the contact tube and the contact bracket, respectively, via one or more fasteners.

18. The contact device of claim 14, wherein the first groove extends along the length of the first finger and a length of the third finger, and wherein the second groove extends along the length of the second finger and a length of the fourth finger.

19. The contact device of claim 1, wherein the first and second welding wires are separate and independent welding wires.

* * * * *